United States Patent
Ochiai et al.

[11] 3,878,204
[45] Apr. 15, 1975

[54] CEPHALOSPORIN DERIVATIVES

[75] Inventors: Michihiko Ochiai, Suita; Osami Aki, Kawanishi; Akira Morimoto, Suita; Taiiti Okada, Kyoto; Katsutada Masuda, Ashiya, all of Japan

[73] Assignee: Takeda Chemical Industries, Ltd., Osaka, Japan

[22] Filed: July 29, 1971

[21] Appl. No.: 167,454

[30] Foreign Application Priority Data
Nov. 10, 1970 Japan.................. 45-99203

[52] U.S. Cl.............................. 260/243 C; 424/246
[51] Int. Cl............................................. C07d 99/24
[58] Field of Search ................... 260/243 C

[56] References Cited
UNITED STATES PATENTS

| | | |
|---|---|---|
| 3,578,661 | 5/1971 | Havranek.................. 260/243 C |
| 3,641,021 | 2/1972 | Ryan et al................... 260/243 C |
| 3,647,788 | 3/1972 | Clark et al................. 260/243 C |
| 3,668,203 | 6/1972 | Clark et al................. 260/243 C |

Primary Examiner—Nicholas S. Rizzo
Attorney, Agent, or Firm—Craig & Antonelli

[57] ABSTRACT

New cephalosporin drivatives of the formula,

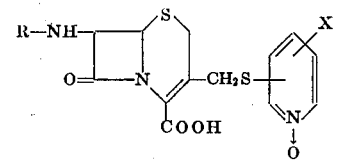

wherein R is hydrogen or an acyl group and X is hydrogen or a halogen, which have a broad antimicrobial spectrum, including Pr. Morganii. Examples thereof include 7-(2′-thienylacetamido)-3-(2″-pyridylthiomethyl)-3-cephem-4-carboxylic acid 1″-oxide, 7-(phenylacetamido)-3-(2′-pyridylthiomethyl)-3-cephem-4-carboxylic acid 1′-oxide, 7-(phenoxyacetamido)-3-2′-pyridylthiomethyl)-3-cephem-4-carboxylic acid 1′-oxide and 7-(5′-amino-5′-carboxyvalerylamido)-3-(2″-pyridylthiomethyl)-3-cephem-4-carboxylic acid 1″-oxide.

19 Claims, No Drawings

CEPHALOSPORIN DERIVATIVES

The present invention relates to novel and useful cephalosporin compounds of the formula:

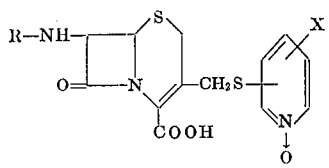

(I)

wherein R is a hydrogen atom or an acyl group, and X hydrogen or a halogen atom, and salts thereof. The invention also relates to processes for producing the same.

There have heretofore been known many cephalosporin C modified compounds by converting the 5-amino-5-carboxyvaleryl group at 7-position of cephalosporin C into various acyl groups and/or by converting its acetoxy group at 3-position into hydrogen, alkoxy group, substituted thio group, tertiary-ammonium group, etc. As such derivatives there have been known those having a broad antimicrobial spectrum, and those which can be administered orally, but no such cephalosporin compounds as are effective to urinary tract infections caused by, for example, Proteus morganii.

It is discovered that the cephalosporin compounds of the formula (I) not only have a broad spectrum antibiotic activity, but also have a strong antibiotic action in relatively low concentrations against Pr. morganii, to which the known cephalosporin and penicillin preparations are ineffective. It is also discovered that the cephalosporin derivaties (I) are very stable in acidic conditions and can be administered orally. Therefore, these compounds (I) may be employed for the medical treatment including the troublesome urinary tract infection pyelitis and the like.

In the cephalosporin compounds (I) of the present invention, the acyl group (symbol R) may be any one which is usable as the N-acyl group of known cephalosporin or penicillin compounds. The acyl group includes

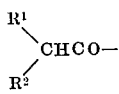

wherein $R^1$ is phenyl, phenoxy, cyclohexenyl, thienyl or 3-amino-3-carboxypropyl group; and $R^2$ is hydrogen or amino group. Examples are 5-amino-5-carboxyvaleryl, thienylacetyl, phenylglycyl, pyridylthioacetyl, cyclohexenylglycyl, phenylacetyl, phenoxyacetyl, alphaphenoxypropionyl and alpha-phenoxybutyryl. In addition, the acyl group includes 2,6-dimethoxybenzoyl, 5-methyl-3-phenyl-4-isoxazolylcarbonyl, 3-o-chlorophenyl-5-methyl-4-isoxazolylcarbonyl, 3-(2,6-dichlorophenyl)-5-methyl-4-isoxazolylcarbonyl, 2,2-dimethyl-5-oxo-4-phenyl-1-imidazolydinyl and the like. Symbol X signifies hydrogen or a halogen such as chlorine, bromine or the like. Such cephalosporin compounds (I) may be in a form of salt with, for example, sodium, potassium, magnesium, calcium, aluminum, triethylamine or the like.

The cephalosporin compounds (I) of the present invention can be produced by reacting a compound of the formula,

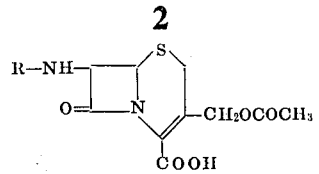

(II)

wherein R is as defined above, or a salt thereof with a compound of the formula,

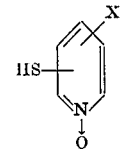

(III)

wherein X is as defined above, or a salt thereof.

This reaction is desirably carried out in a solvent which may be exemplified by water or an organic solvent which is easily miscible with water but inert to the starting compounds.

Preferable organic solvents may, for example, be dimethylformamide, dioxane, acetone, alcohol, acetonitrile, dimethyl sulfoxide, tetrahydrofuran of the like. The reaction temperature and time varies with the starting materials to be used, the proportion therebetween, the solvent employed and the like. The temperature usually falls within the range from 0° to 100°C. The reaction time may usually be from several hours to several days, preferably, two hours to two days. It is desirable to carry out the reaction at a pH from 2 to 8, preferably from 5 to 8. Purification of thus obtained product may be conducted by means of column chromatography, extraction, precipitation, counter current partition or the like.

Among the compounds of the formula (I), 7-acylamide compounds of the formula:

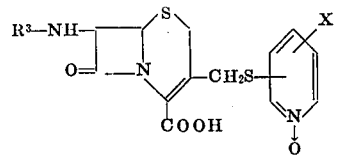

(IV)

wherein $R_3$ is an acyl group and X is as defined above, may be subjected to the deacylation reaction to obtain a 7-aminocephem derivative of the formula:

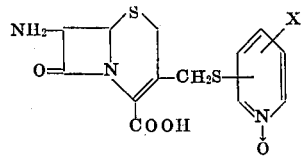

(V)

wherein the symbols are the same as above, and then the derivative (V) is reacted with an acylating agent which can introduce an acyl group (R) which is different from $R^3$. These reactions can be utilized for converting the acyl group $R^3$ of the cephalosporin compounds. Particularly, 5-amino-5-carboxyvaleryl group of cephalosporin C can be converted to a desired acyl group, e.g. thienylacetyl, phenylglycyl and so on. For instance, N-oxo-pyridylthiomethyl group is introduced into 3-position of cephalosporin C, then the acyl group at 7-position is eliminated according to per se known process and finally thus obtained compounds (V) is reacted with the desired acylating agent.

The deacylation reaction can be effected as by a similar manner employed in the production of 7-aminocephalosporanic acid from cephalosporin C. For example, when the acyl group at the 7-position of the cephalosporin derivatives (I) has free amino group, 7-amino cephem derivative (V) can be obtained by treating the derivatives (I) with a nitrosation agent, followed by hydrolysis. The nitrosation agent includes, for example, nitrosyl chloride, nitrosyl bromide, nitrous acid, aliphatic alcohol esters of nitrous acid, nitrogen dioxide, nitrosylsulfuric acid and the like. This reaction is usually carried out in a solvent. Such aliphatic acids as formic acid, acetic acid and the like are commonly used as the solvent. Alternatively, solvent mixtures of these acids and conventional organic solvents such as benzene, toluene, nitromethane, dichloromethane, chloroform, tetrahydrofuran and the like may be used. The reaction temperature is not critical. However, it is preferable to conduct the reaction under cooling in order to suppress the undesirable side reactions. The reaction product can be hydrolyzed even without isolation. For instance, the reaction product is generally poured into water under cooling, to obtain 7-amino-3-(2'-pyridyl-thiomethyl)-3-cephem-4carboxylic acid 1'-oxide.

If the acyl group at the 7-position of the cephalosporin derivatives (I) has no amino group, the deacylation reaction may be conducted by treating the derivatives (I) with an imido halide forming agent and thus-obtained imido halide is converted into the imino ether, followed by hydrolysis. These reactions may be also applicable to the cephalosporin compounds having protected amino group, the protecting group of which does not interfere this reaction; for example, benzyloxycarbonyl, methoxycarbonyl, t-butyloxycarbonyl, i-butyloxycarbonyl, beta-methylsulphonylethoxycarbonyl and the like. The imido halide forming agent may be a halide derived from carbon, phosphor or sulfur, or an oxyhalide derived from their oxy acids. They include, for example, phosphorus oxychloride, phosphorus penta-chloride, phosphorus trichloride, thionyl chloride, phosgene, oxalyl chloride and the like. The imido halide forming reaction is advantageously conducted in a solvent. The preferable solvent is a tertiary amine such as triethylamine, pyridine, dimethylaniline or the like. After the imido halide formation, an alcohol is added to the reaction mixture to obtain the corresponding imino ether. The alcohol employed in the imino ether formation may be a lower alcohol such as methanol, ethanol or the like. It is preferred to conduct the above-mentioned reactions under cooling in order to suppress the undesirable side reactions. Thus-obtained imono ether is hydrolyzed with water to give 7-amino-3-(2'-pyridylthiomethyl)-3-cephem-4-carboxylic acid 1'-oxide. This hydrolysis may be carried out more smoothly by adding a small quantity of acid such as formic acid, acetic acid, etc. On the completion of the hydrolysis, the pH of the reaction mixture is adjusted to from 3.5 to 4.0 to yield in high purity the desired 7-amino-3-(2'-pyridylthiomethyl)-3-cephem-4-carboxylic acid 1'-oxide.

In these deacylating reactions, the carboxyl group of the starting cephalosporin compounds (I) may be protected as in the form of an ester such as benzyl, beta-methylsulphenylethyl, benzhyldryl,trimethylsilyl ester or the like.

Thus obtained 7-amino cephem derivatives (V) may be treated with a suitable carboxylic acid or its functional derivatives to prepare the desirable cephalosporin compounds having excellent antibiotic activity.

The desirable carboxylic acids employed for the acylation include phenylglycine or its substituted derivatives at the amino group, phenylmalonic acid or its derivatives modified at one carboxyl group, phenylacetic acid, para-nitrophenylacetic acid, cyclo-hexenylglycine or its substituted derivatives at the amino group, trimethylcyclohexenylglycine, thienylacetic acid and the like. The substitutent of the above-mentioned amino group includes methoxycarbonyl, benzyloxycarbonyl, t-butoxycarbonyl, benzoyl, nitrobenzoyl and the like.

In the acylation reaction, when a free carboxylic acid is employed as the acrylating agent, it is advantageous to use a suitable condensing agent. The condensing agent includes, for example, N,N'-disubstituted carbodiimides such as N,N'-dicyclohexyl-carbodiimide and the like; azolide compounds such as N,N'-carbonyldiimidazole, N,N'-thionyldiimidazole and the like; and such dehydrating agents as N-ethoxycarbonyl-2-ethoxy-1,2-dihydroquinoline, phosphorus oxychloride, alkoxyacetylene and the like.

The functional derivatives of the carboxylic acids include acid halides, acid anhydrides, mixed acid anhydrides, active amides, esters and the like. Particularly usable examples are acid chloride, alkyl-carbonic acid anhydrides, mixed anhydrides with an aliphatic carboxylic acid, acid azolides and the like.

This reaction, in general, can advantageously and smoothly be conducted in a solvent. The solvent may be any common solvent or solvent mixture so long as it does not interfere the reaction of the present invention. It includes water, acetone, tetrahydrofuran, dioxane, acetonitrile, chloroform, dichloromethane, dichloroethylene, pyridine, dimethylaniline, dimethylformamide, dimethylacetamide, dimethyl sulfoxide and the like. The reaction temperature is not critical. However, the reaction is usually carried out under cooling or at room temperature.

The cephalosporin compounds (I) of the present invention can be used as, for example, injection or capsule, etc. in a similar manner to the known cephalosporin preparations, but their dosage,dosage form, etc. vary with their acyl groups at 7-position. The present compounds (I) possess strong antibiotic activity to a number of pathogenic microorganisms, to which the known cephalosporin preparations are ineffective, such as Proteus morganii and the like. 7-(2'-thienylacetamido)-3-(2''-pyridylthiomethyl)-3-cephem-4-carboxylic acid 1''-oxide, for example, is effective by injecting hypodermically its aqueous solution containing 1 g to 6 g per day per adult. 7-(D-2'-amino-2'-phenylacetamido)-3-(2''-pyridylthiomethyl)-3-cephem-4-carboxylic acid 1''-oxide, for example, can also be orally administered in a dose of 0.25 to 1 g per day per adult. Similar dosages can be applied to any other compounds falling within this invention.

In the following examples, parts are referred to by weight unless otherwise noted.

EXAMPLE 1

84 Parts of sodium 7-(2'thienylacetamido) cephalosporanate and 30 parts of sodium salt of 2-mercaptopyridine 1-oxide were dissolved in 1000 parts by volume of water. The aqueous solution was heated up to 60°C, and reaction was allowed to continue for 8 hours with stirring. The reaction product was purified with a column packed with polystyrene resin (Amberlite XAD-II) to give 40 parts of sodium salt of 7-(2'-thienylacetamido)-3-(2''-pyridylthiomethyl)-3-cephem-4-carboxylic acid 1''-oxide.

The product was lyophilized and subjected to thin-layer chromatography on silica gel employing the following two solvent systems for the respective developments:

Solvent system (A): a mixture of a saturated aqueous solution of sodium chloride, isoamyl acetate, methanol and formic acid (10:65:20:5, in volume)

Solvent system (B): a mixture of a saturated aqueous solution of sodium chloride, n-butyl alcohol and acetic acid (1:3:1, in volume)

These solvent systems were left standing for about two hours, then with the resulting supernatants of the solvent systems (A) and (B), the respective developments were conducted to give a single spot showing the Rf value 0.3 to 0.4 and a single spot showing the Rf value 0.2 to 0.3.

Elementary analysis:
Calculated for $C_{19}H_{16}N_3O_5S_3Na \cdot \tfrac{1}{2}H_2O$:
C, 46.14; H, 3.46; N, 8.49
Found: C, 46.15; H, 3.79; N, 8.48

The IR spectrum (KBr tablet) of the present product includes an absorption due to beta-lactam at 1,750 to 1,760 cm$^{-1}$. The NMR spectrum (in heavy water, 100 MHz) includes an AB type absorptions of the protons at 2 position of cephem ring at 3.70 ppm; the absorptions ($J_{6-7}$ = 5 cps) of the protons at 6 and 7 positions at 5.18 and 5.77 ppm, respectively; and multiplet absorption of the proton of pyridine ring and thiophene ring at 7.18 to 8.50 ppm.

MIC (agar dilution method, mcg/ml)
("MIC" means minimum inhibitory concentration)

| | Present product | Control* |
|---|---|---|
| Staphylococcus aureus | <0.01 | <0.02 |
| Bacillus subtilis | 0.1 | 0.02 |
| Sarcina lutea | 0.1 | 0.1 |
| Escherichia coli | 5 | 20 |
| Klebsiella pneumoniae | 2 | 2 |
| Proteus vulgaris | 2 | 10 |
| Proteus morganii | 10 | >100 |

*7-(2'-thienylacetamido)cephalosporanic acid

EXAMPLE 2

1,420 Parts of cephalosporin C and 450 parts of sodium salt of 2-mercaptopyridine 1-oxide were dissolved in 10,000 parts by volume of water. The aqueous solution was heated to 50° to 51°C, and allowed to react for 21 hours. The reaction product was purified with a column packed with polystyrene resin (Amberlite XAD-II) to give 550 parts of sodium salt of 7-(5'-amino-5'-carboxyvalerylamido)-3-(2''-pyridylthiomethyl)-3-cephem-4-carboxylic acid 1''-oxide.

Elementary analysis:
Calculated for $C_{19}H_{21}N_4O_7S_2Na_2 \cdot \tfrac{1}{2}H_2O$:
C, 41.54; H, 4.77; and N, 10.19
Found: C, 41.44; H, 4.84; and N, 10.26

In UV absorption spectrum (water), the present product gave an absorption maxima at 236 $\mu$ ($\epsilon$=28,800) and at 265 $\mu$ ($\epsilon$=17,000). In NMR spectrum (heavy water, 100 MHz), it gave a quartet of 2-position methylene hydrogens at 3.75 ppm; a quartet of 3-position methylene hydrogens at 4.31 ppm; and doublets of 6- and 7-position hydrogens at 5.23 and 5.77 ppm, respectively.

EXAMPLE 3

8,160 Parts of 7-aminocephalosporanic acid, 2,550 parts of sodium hydrogen carbonate and 5,400 parts of sodium salt of 2-mercaptopyridine 1-oxide were dissolved in 150,000 parts by volume of water. The mixture was allowed to react at 40°C for 40 hours. Dilute hydrochloric acid was added to the reaction mixture after cooled. The resulting precipitate was collected obtain 6,820 parts of 7-amino-3-(2'-pyridylthiomethyl)-3-cephem-4-carboxylic acid 1-oxide.

Elementary analysis:
Calculated for $C_{13}H_{13}N_3O_4S_2 \cdot \tfrac{1}{2}H_2O$:
C, 44.81; H, 4.04; and N, 12.06
Found: C, 44.74; H, 3.77; and N, 12.21

In UV absorption spectrum (a 0.6 % aqueous solution of sodium hydrogen carbonate), the present product gave absorption maxima at 236 $\mu$ ($\epsilon$ = 21,300) and at 264.5 $\mu$ ($\epsilon$ = 13,800). In NMR spectrum (an aqueous solution of sodium hydrogen carbonate, 100 MHz), it gave a quartet of 2-position methylene hydrogens at 3.76 ppm; a quartet of 3-position methylene hydrogens at 4.30 ppm; doublets of 6- and 7-position hydrogens at 5.20 and 5.62 ppm, respectively; and an absorption of the hydrogens of pyridine nucleus at 7.4 to 8.5 ppm.

MIC (agar dilution method, mcg/ml)

| | Present product | Control* |
|---|---|---|
| Staphylococcus aureus | 0.5 | 50 |
| Bacillus subtilis | 2 | 50 |
| Sarcina lutea | 2 | >100 |
| Escherichia coli | 50 | >100 |
| Klebsiella pneumoniae | 20 | >100 |
| Proteus vulgaris | 50 | >100 |

*7-aminocephalosporanic acid

EXAMPLE 4

3,640 Parts of sodium 7-(D-2-t-butoxycarbonylamino-2-phenylacetamido)-cephalosporanate and 1,200 parts of sodium salt of 2-mercaptopyridine 1-oxide were dissolved in 60,000 parts by volume of water. The mixture was allowed to react at 50°C for 24 hours. The reaction mixture was acidified with dilute hydrochloric acid. The resulting precipitate was filtered to obtain 2,970 parts of 7-(D-2'-t-butoxycarbonylamino-2'-phenylacetamido)-3-(2''-pyridylthiomethyl)-3-cephem-4-carboxylic acid 1''-oxide.

This product was treated with trifluoroacetic acid to give 7-(D-2'-amino-2'-phenylacetamido)-3-(2''-pyridylthiomethyl)-3-cephem-4-carboxylic acid 1'''-oxide. In NMR spectrum (trifluoroacetic acid, 100 MHz), it gave a quartet of 2-position methylene hydrogens at 3.64 ppm; a quartet of 3-position methylene hydrogens at 4.46 ppm; and doublets of 6- and 7-position hydrogens at 5.19 and 5.80 ppm, respectively.

The present product can also be obtained by the reaction of 405 parts of 7-(D-2-amino-2-phenylacetamido)cephalosporanic acid, 84 parts of sodium hydrogen carbonate and 149 parts of sodium salt of 2-mercaptopyridine 1-oxide in 6,000 parts by volume of water.

| | MIC (agar dilution method, mcg/ml) | |
|---|---|---|
| | Present product | Control* |
| Staphylococcus aureus | 0.5 | 5 |
| Bacillus subtilis | 0.1 | 0.2 |
| Sarcina lutea | 0.01 | <0.2 |
| Escherichia coli | 10 | 50 |
| Klebsiella pneumoniae | 5 | 10 |
| Proteus vulgaris | 2 | 5 |
| Proteus morganii | 2 | 100 |

*7-(D-2-amino-2-phenylacetamido) cephalosporanic acid

EXAMPLE 5

2,090 Parts of sodium 7-(2'-thienylacetamido)cephalosporanate, and 750 parts of sodium salt of 4-mercaptopyridine 1-oxide were dissolved in 30,000 parts by volume of water. The mixture was allowed to react at 59° to 60°C for 6 hours. After the insolubles had been removed by filtration, dilute hydrochloric acid was added to the reaction mixture. The resulting precipitate was filtered and washed with a small amount of chloroform to obtain 2,000 parts of 7-(2'-thienylacetamido)-3-(4''-pyridylthiomethyl)-3-cephem-4-carboxylic acid 1''-oxide.

Elementary analysis:
Calculated for $C_{19}H_{17}N_3O_5S_3.H_2O$:
C, 47.38; H, 3.97; and N, 8.72
Found: C, 47.24; H, 3.71; and N, 8.65

In NMR spectrum (heavy water, 100 MHz), the sodium salt of the present product gave a quartet of 2-position methylene hydrogens at 3.60 ppm; a singlet of methylene hydrogens of thenyl group at 4.02 ppm; a quartet of 3-position methylene hydrogen at 4.30 ppm; and doublets of 6- and 7-position hydrogens at 5.14 and 5.74 ppm, respectively.

EXAMPLE 6

45,000 Parts of sodium 7-(2'-thienylacetamido)-cephalosporanate and 18,000 parts of sodium salt of 2-mercaptopyridine 1-oxide were dissolved in 450,000 parts by volume of water. The mixture was allowed to react at 62°C for 6 hours. After the insolublets had been removed by filtration, dilute hydrochloric acid was added to the reaction mixture. The resulting precipitate was filtered and washed with a small amount of chloroform to obtain 47,000 parts of 7-(2'-thienylacetamido)-3-(2''-pyridylthiomethyl)-3-cephem-4-carboxylic acid 1''-oxide. The sodium salt of the present product coincided with the product in Example 1 in all respects.

EXAMPLE 7

1.84 Parts of N-t-butoxycarbonyl-D-phenylglycine and 1.08 parts of triethylamine were added to 20 parts by volume of dry tetrahydrofuran. The mixture was cooled to −6°C. 1.06 Parts by volume of isobutyl chlorocarbonate was added dropwise to the thus cooled mixture at −6° to −10°C. On the completion of the dropwise addition, the mixture was warmed up to room temperature and stirred for 30 minute. The triethylamine hydrochloride precipitated was filtered off. The solution of the mixed acid anhydride obtained was added to a mixture of 1.77 parts of 7-amino-3-(2''-pyridylthiomethyl)-3-cephem-4-carboxylic acid 1'-oxide and 200 parts by volume of dimethylacetamide. Thus obtained mixture was stirred for 2 hours at room temperature. The dimethylacetamide was distilled off under reduced pressure. A mixture of 24 parts of trifluoroacetic acid and 6 parts of anisole was added to the residue. The mixture was allowed to react for 5 minute at room temperature, and then concentrated under reduced pressure. The concentrated substance was treated with an ion exchange resin (Amberlite LA-1) and freeze-dried to obtain 0.83 part of 7-(D-2'-amino-2'-phenylacetamido)-3-(2''-pyridylthiomethyl)-3-cephem-4-carboxylic acid 1''-oxide. A part of the present product was purified by dissolving it in a 5 % aqueous solution of sodium hydrogen carbonate and passing the thus obtained solution through a column packed with polystyrene resin (Amberlite XAD-II) to obtain its sodium salt.

Elementary analysis:
Calculated for $C_{21}H_{19}N_4O_5S_2Na.\frac{1}{2}H_2O$:
C, 50.08; H, 4.00; and N, 11.12
Found: C, 50.13; H, 4.37; and N, 11.03

In UV absorption spectrum (water), it gave absorptions at 236 $\mu$ ( $\epsilon = 28,900$) and 263 $\mu$ ( $\epsilon = 16,100$). In NMR spectrum (heavy water, 100 MHz), it gave a quartet of 2-position methylene hydrogens at 3.49 ppm; a quartet of 3-position methylene hydrogens at 4.20 ppm; and doublets of 6- and 7-position hydrogens at 5.14 and 5.84 ppm, respectively.

EXAMPLE 8

3.48 Parts of 7-amino-3-(2'-pyridylthiomethyl)-3-cephem-4-carboxylic acid 1'-oxide was suspended in 60 parts by volume of dimethylacetamide. 2.0 Parts of 2-thienylacetyl chloride was added to the suspension and stirred for 3 hours. The insolubles were filtered off. The dimethylacetamide was distilled off under reduced pressure. Water was added to the residue. The resulting precipitate was collected and washed with chloroform to obtain 2.5 parts of 7-(2'-thienylacetamido)-3-(2''-pyridylthiomethyl)-3-cephem-4-carboxylic acid 1''-oxide.

In NMR spectrum (heavy dimethyl sulfoxide, 100 MHz), the present product gave a quartet of 2-position methylene hydrogens at 3.60 ppm; a singlet of 3-position methylene hydrogens at 3.73 ppm; a singlet of methylene hydrogens of thenyl group at 4.05 ppm; a doublet of 6-position hydrogen at 5.07 ppm; and a doublet of 7-position hydrogen at 5.62 ppm.

EXAMPLE 9

418 Parts of sodium 7-(2-thienylacetamido) cephalosporanate and 184 parts of sodium salt of 2-mercapto-4-chloropyridine 1-oxide were dissolved in 5,000 parts by volume of water. The water was allowed to react at 55° to 57°C for 5 hours. After the mixture was cooled, dilute hydrochloric acid was added to the reaction mixture. The resulting precipitate was collected and washed with chloroform to obtain 350 parts of 7-(2'-thienylacetamido)-3-(2''-(4''-chloropyridyl)-thiomethyl)-3-cephem-4-carboxylic acid 1''-oxide.

Elementary analysis:
Calculated for $C_{19}H_{16}N_3O_5S_3Cl$:
C, 45.82;  H, 3.23;  and N, 8.41
Found: C, 45.73;  H, 3.27;  and N, 8.11

EXAMPLE 10

3 Parts of 7-(5'-carboxy-5'-t-butoxycarbonylaminovalerylamido)-3-(2''-pyridylthiomethyl)-3-cephem-4-carboxylic acid 1''-oxide, which was prepared by treating sodium 7-(5'-carboxy-5'-t-butoxycarbonylaminovalerylamido)-cephalosporanate in the same way as in Example 4, was added to 100 parts by volume of dichloromethane. 5 Parts by volume of pyridine and 10 parts by volume of trimethylchlorosilane were added to the mixture, and stirred for 10 min. at room temperature. The reaction mixture was cooled to −10°C. 10 Parts of pyridine and 7 parts of phosphorus pentachloride were added to the cooled mixture, and stirred for 20 min. to form the imide halide. The reaction mixture was further cooled to −20°C. 125 Parts by volume of methanol was added thereto to prepare the imino ether. The thus obtained mixture was warmed up to room tempature, and 20 parts by volume of a 25 % aqueous formic acid was added thereto. Triethylamine was further added thereto to adjust the pH at 3.5 to 4.0. The resulting precipitate was filtered to obtain 7-amino-3-(2'-pyridylthiomethyl)-3-cephem-4-carboxylic acid 1'-oxide.

In UV absorption spectrum (a 0.6 % aqueous solution of sodium hydrogen carbonate), the present product gave absorption maxima at 236 $\mu$ ( $\epsilon$ = 21,300) and 264.5 $\mu$ ($\epsilon$ = 13,800). In NMR spectrum (heavy water-sodium hydrogen carbonate, 100 MHz), it gave a quartet of 2-position methylene hydrogens at 3.76 ppm; a quartet of 3-position methylene hydrogens at 4.30 ppm; doublets of 6- and 7-position hydrogens at 5.20 and 5.62 ppm, respectively; and an absorption of hydrogen of pyridine nucleus at 7.4 to 8.5 ppm.

EXAMPLE 11

2.3 Parts of disodium salt of 7-(5'-carboxy-5'-aminovalerylamino)-3-(2''-pyridylthiomethyl)-3-cephem-4-carboxylic acid 1''-oxide was dissolved in 7 parts by volume of 99 % formic acid while ice cooling. A solution comprising 0.6 part of nitrosyl chloride and 2 parts of formic acid was added to the cooled solution. After 5 min., the reaction mixture was concentrated under reduced pressure. 7 Parts by volume of water was added to the thus concentrated residue. An aqueous solution of sodium hydroxide was added thereto to control the pH at 3.5 to 4.0. The resulting precipitate was filtered to obtain 7-amino-3-(2'-pyridylthiomethyl)-3-cephem-4-carboxylic acid 1'-oxide.

EXAMPLE 12

82.4 Parts of sodium 7-phenylacetamidocephalosporanate and 33 parts of sodium salt of 2-mercaptopyridine 1-oxide were dissolved in 800 parts by volume of water. The mixture was allowed to react at 51°C for 22 hours. Thereafter, the reaction mixture was acidified with dilute hydrochloric acid. The resulting precipitate was collected and washed with water to obtain 60 parts of 7-phenylacetamido-3-(2'-pyridylthiomethyl)-3-cephem-4-carboxylic acid 1'-oxide.

In NMR spectrum (heavy dimethyl sulfoxide, 100 MHz), the present product gave a quartet of 2-position methylene hydrogens at 3.61 ppm; a singlet of 3-position methylene hydrogens at 4.07 ppm; a singlet of methylene hydrogens of 7-position phenylacetamido group at 3.52 ppm; a doublet of 6-position hydrogen at 5.06 ppm; a quartet of 7-position hydrogen at 5.63 ppm; and a multiplet of hydrogens of phenyl and pyridine nuclei at 7.20 to 8.30 ppm.

EXAMPLE 13

428 Parts of sodium 7-phenoxyacetamidocephalosporanate and 180 parts of sodium salt of 2-mercaptopyridine 1-oxide were dissolved in 5,000 parts by volume of water, and allowed to react at 50°C for 20 hours. The reaction mixture was treated in the same way as in Example 12 to obtain 190 parts of 7-phenoxyacetamido-3-(2'-pyridylthiomethyl)-3-cephem-4-carboxylic acid 1'-oxide.

In NMR spectrum (heavy water-sodium hydrogen carbonate, 100 MHz), the present product gave a quartet of a 2-position methylene hydrogens at 3.56 ppm; a quartet of 3-position methylene hydrogens at 4.21 ppm; a singlet of methylene hydrogens of 7-position phenoxy group at 4.72 ppm; and doublets of 6- and 7-position hydrogens at 5.15 and 5.79 ppm, respectively.

We claim:
1. A compound of the formula,

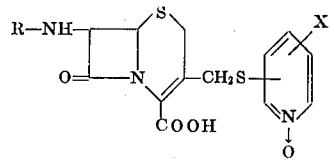

wherein R is a hydrogen or an acyl group of the formula,

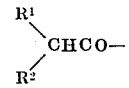

wherein $R^1$ is phenyl, phenoxy, cyclohexenyl, thienyl, or 3-amino-3-carboxypropyl group; and $R^2$ is hydrogen or amino group; and X is hydrogen, chlorine, or bromine; or a sodium, potassium, magnesium, calcium, aluminum or triethylamine salt thereof.

2. A compound claimed in claim 1, namely 7-(2'-thienylacetamido)-3-(2''-pyridylthiomethyl)-3-cephem-4-carboxylic acid 1''-oxide.

3. A compound claimed in claim 1, namely 7-(5'-amino-5'-carboxyvalerylamido)-3-(2''-pyridylthiomethyl)-3-cephem-4-carboxylic acid 1''-oxide.

4. A compound claimed in claim 1, namely 7-(D-2'-amino-2'-phenylacetamido)-3-(2''-pyridylthiomethyl)-3-cephem-4-carboxylic acid 1''-oxide.

5. A compound claimed in claim 1, namely 7-(2'-thienylacetamido)-3-(4''-pyridylthiomethyl)-3-cephem-4-carboxylic acid 1''-oxide.

6. A compound claimed in claim 1, namely 7-(2'-thienylacetamido)-3-(2''-(4''-chloropyridyl)thiomethyl)-3-cephem-4-carboxylic acid 1''-oxide.

7. A compound claimed in claim 1, namely 7-(phenoxyacetamido)-3-(2'-pyridylthiomethyl)-3-cephem-4-carboxylic acid 1'-oxide.

8. A compound claimed in claim 1, namely 7-(phenylacetamido)-3-(2'-pyridylthiomethyl)-3-cephem-4-carboxylic acid 1'-oxide.

9. A compound according to claim 1, wherein R is hydrogen.

10. A compound claimed in claim 9, namely 7-amino-3-(2'-pyridylthiomethyl)-3-cephem-4-carboxylic acid 1'-oxide.

11. A compound according to claim 1, wherein $R_1$ is phenyl or thienyl.

12. A compound according to claim 11, wherein $R_1$ is phenyl.

13. A compound according to claim 11, wherein $R_1$ is thienyl.

14. A compound according to claim 11, wherein $R_2$ is hydrogen.

15. A compound according to claim 11, wherein $R_2$ is amino.

16. A compound according to claim 11, wherein X is hydrogen.

17. A compound according to claim 11, wherein X is chlorine.

18. A compound according to claim 11, wherein X is bromine.

19. A compound according to claim 11, wherein said compound is a sodium, potassium, magnesium, calcium, aluminum or triethylamine salt.

* * * * *